April 19, 1927.
A. F. LEE
1,625,731
HANDLE FOR COOKING UTENSILS
Filed Nov. 19, 1925
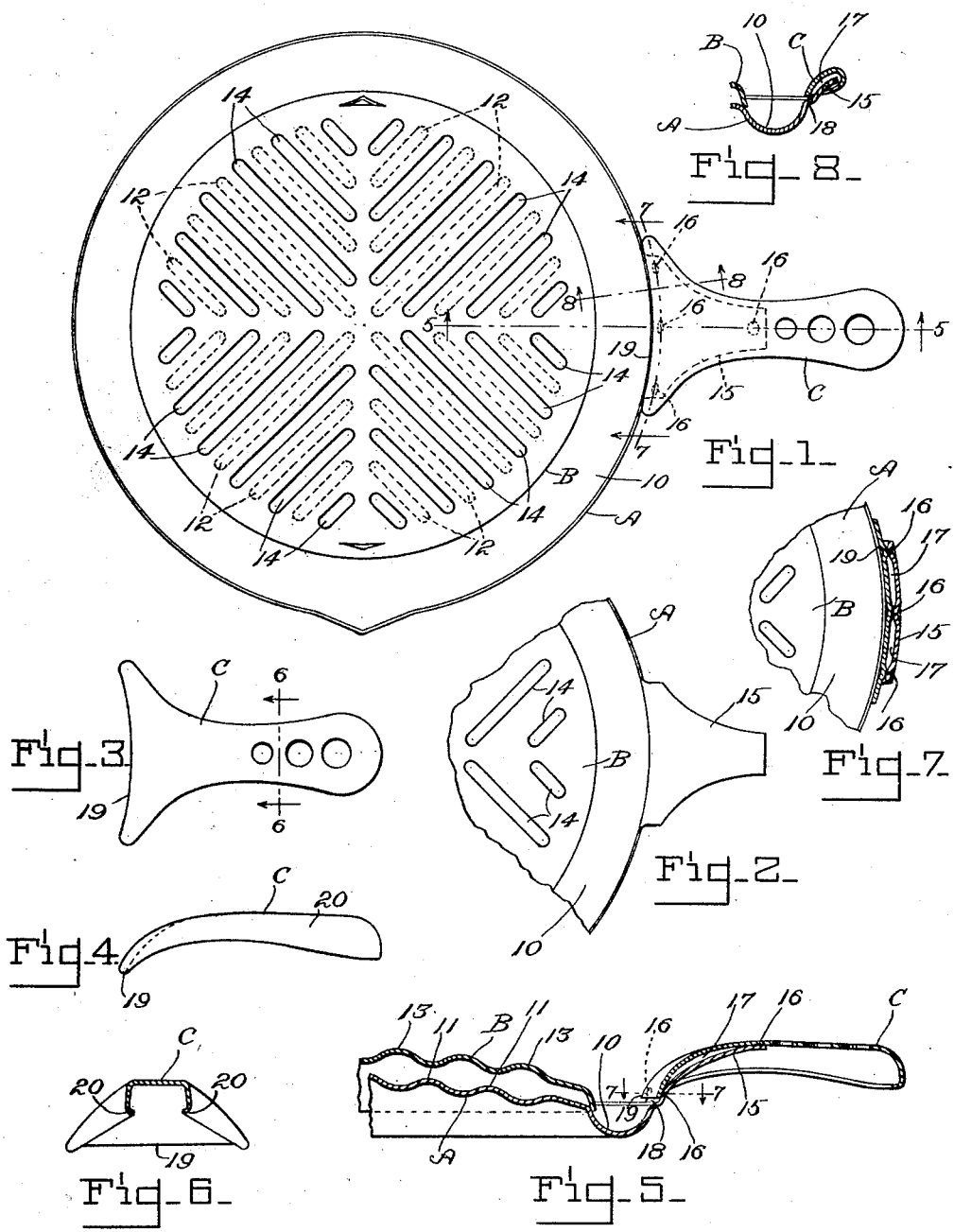
INVENTOR:
Alexander F. Lee
By Macleod, Calver, Copeland & Dike
ATTORNEYS Patented Apr. 19, 1927.

1,625,731

UNITED STATES PATENT OFFICE.

ALEXANDER F. LEE, OF BOSTON, MASSACHUSETTS.

HANDLE FOR COOKING UTENSILS.

Application filed November 19, 1925. Serial No. 70,020.

The invention relates to handles for cooking utensils. The object of the invention is to provide a metallic handle for a cooking utensil so constructed and combined with the utensil without the intervention of a heat insulating material that the handle will not become so highly heated as to render it uncomfortably warm to the hand, no matter how hot the body of the utensil may become during its use.

The invention is particularly intended for use in broilers which are held in the hand during the broiling operation. If a wooden handle is employed, it sometimes becomes charred after constant exposure to the heat or if it is not charred it becomes brittle. Moreover if a wooden handle is employed, it is usually in the form of a sleeve on a metal rod which projects from the broiler and is sometimes secured by screws or mounted on a screw threaded shank and after a time the metal parts become rusty and the wooden handle is worn loose by being constantly tightened up. For the above reasons an all metal handle is preferred. If the all metal handle is integral with the broiler or is first formed as a separate member and then attached to the body of the broiler in such manner that there is surface contact of the handle with the broiler to any material extent, intense heat will be conducted by the broiler to the handle sufficient to render the handle too hot to be held by the hands during the broiling.

The invention will be fully understood from the following description when taken in connection with the accompanying drawings and the novel features thereof will be pointed out and clearly defined in the claim at the close of this specification.

In the drawings:

Fig. 1 is a plan view of a broiler embodying the invention.

Fig. 2 is a fragmentary view of the broiler before the main handle is attached.

Fig. 3 is a plan view of the handle member before it is attached.

Fig. 4 is a side elevation of the handle shown in Fig. 3.

Fig. 5 is a sectional view on line 5—5, Fig. 1.

Fig. 6 is a section taken on the line 6—6, Fig. 3.

Fig. 7 is a sectional view on line 7—7, Fig. 1.

Fig. 8 is a sectional view on line 8—8, Fig. 1.

The invention is shown as embodied in a double grid broiler for purpose of illustration.

Referring to the drawings, there is shown at A the lower grid member and at B the upper grid member of a broiler. The lower grid member consists of a disk having an annular groove or depression 10 on its upper side around the inside of the periphery and a central portion having ribs 11 formed with grooves to conduct the juices to the annular groove 10. It is formed with slots 12 between the said ribs 11 to allow the flame to pass up to the upper grid B and to the meat or other food being cooked. The upper grid B on which the food is placed is of smaller diameter than the lower grid A and rests on the lower grid. It is formed with ribs 13 having grooves to conduct the juices to the annular groove 10 and is formed with slots 14 between the ribs 13 through which some of the juices will drip to the grooves of the lower grid, the upper slots 14 being directly over the grooves in the lower grid.

A single grid, however, may be employed instead of a double grid. The lower or main grid A is formed with a stem or shank member 15 to which the main handle C is secured. The stem member 15 is shown as integral with the lower grid member A. It is not essential, however, that it be integral with the member A.

The main handle member C is of metal and has a portion thereof which laps over the stem member 15 but spaced apart therefrom and to which it is secured at a plurality of points 16. The preferred method of securing the handle to the stem member 15 is by spot welding, the welding spots being shown at 16, but instead of spot welding, rivets or other suitable means for uniting the two members together at a plurality of separated points may be employed.

The handle member C is so shaped with relation to the stem member 15 that there is an air space 17 between the handle member C and the stem member 15 not only between their surfaces but around the edges and there is also a narrow space, as shown at 18, between the inner end 19 of the handle C and the periphery of the grid. There is no contact of any part of the main handle member C with either the grid or the stem member 15 to which the handle C is attached except at the small points of attachment shown at 16. There is thus not only a very small area of actual metallic contact between the main handle and any part of the broiler or the stem member 15 but there is an air space between the two adjacent overlapping surfaces of the two members and on all sides thereof, thereby allowing a free circulation of air. The amount of heat conducted from the broiler to the handle C is so slight that in the use of a device in cooking, the handle will never become heated to a sufficient extent as to be inconveniently warm to the touch even if the broiler itself becomes red hot.

Preferably the handle is stamped out of sheet metal and is curved over at the sides, as shown at 20, so as to form a better hand grasp and avoid sharp edges from coming in contact with the hand. Moreover the particular form of grid is immaterial to the present invention.

While the invention has been described particularly as embodied in a broiler, it is applicable to use with any kind of metallic cooking vessel.

What I claim is:

A cooking utensil having a metallic stem projecting therefrom and a metallic handle having a portion at one end thereof overlapping said stem, spaced apart from said stem and secured to said stem at a plurality of points, there being an air space between the overlapping portions of said stem and handle and between the said handle and the body of the utensil, said points of attachment being small relative to the area of the overlapping portions and being the only metallic contact between the said handle and the body and stem of the utensil.

In testimony whereof I affix my signature

ALEXANDER F. LEE.